United States Patent [19]
Champane

[11] Patent Number: 4,878,708
[45] Date of Patent: Nov. 7, 1989

[54] MOTOR VEHICLE SUNSHIELD

[76] Inventor: Dean J. Champane, 7001 Chicago Rd., Warren, Mich. 48092

[21] Appl. No.: 267,799

[22] Filed: Nov. 7, 1988

[51] Int. Cl.$^4$ .............................................. B60J 3/00
[52] U.S. Cl. ................................. 296/97.7; 296/979; 296/97.8; 160/370.2; 160/84.1
[58] Field of Search ..................... 296/97.1, 97.7, 97.8, 296/97.9; 160/84.1, 368.1, 370.2, DIG. 3

[56] References Cited

U.S. PATENT DOCUMENTS

| | | | |
|---|---|---|---|
| 4,202,396 | 5/1980 | Levy | 296/97.7 X |
| 4,261,649 | 4/1981 | Richard | 296/97.7 X |
| 4,652,039 | 3/1987 | Richards | 296/97.7 |
| 4,763,947 | 8/1988 | Gregg | 296/97.7 X |
| 4,777,994 | 10/1988 | Nedervelo | 296/97.7 X |
| 4,805,955 | 2/1989 | Levy | 296/97.1 X |

FOREIGN PATENT DOCUMENTS 3447203 7/1986 Fed. Rep. of Germany ..... 296/97.7

*Primary Examiner*—Dennis H. Pedder
*Attorney, Agent, or Firm*—Dykema Gossett

[57] ABSTRACT

In a motor vehicle having a windshield, a dashboard and a pair of end pillars, a collapsible sunshield of resilient material including symmetrical top and bottom sections with a horizontal fold line therebetween. Each section includes non-symmetrical central and end panels arranged on transverse fold lines. Inner and outer backing panels are arranged between the central and end panels on transverse fold lines. The sunshield bears against the windshield with the end panels yieldably anchored between the pillars and is self-supported upon the dashboard.

9 Claims, 2 Drawing Sheets

MOTOR VEHICLE SUNSHIELD

FIELD OF THE INVENTION

The present invention relates to a protective cover for windshields for excluding the sun from the interior when the vehicle is not in use and collapsible to a compact unit for storage.

BACKGROUND OF THE INVENTION

Previously, various efforts have been made to exclude the rays of the sun from the windshields of vehicles not in use to maintain a reduced temperature upon the inside of the vehicle. Various means have been provided for anchoring the sunshield over and against the windshield.

Previously, the difficulty has been in providing a windshield protector which is sufficient to cover the windshield area when opened to conform to the windshield and which can be folded when not in use, but which in the use position is provided with additional means, including parts of the vehicle by which the sunshield is held in place such as with the sun visors, with the rearview mirror or with other clips, panels, folds or the like.

THE PRIOR ART

A previous example of a sunshield for a motor vehicle is shown in U.S. Pat. No. 4,202,396 of May 13, 1980.

The difficulty with the sunshield disclosed in U.S. Pat. No. 4,202,396 resides in the difficulty of anchoring the sunshield in a position adjacent the windshield, normally requiring the use of the sun visors, the rearview mirror and/or the use of tabs or extensions to provide an interlock between portions of the vehicle and the sunshield or for suspending the sunshield by hooks or other devices when the vehicle is not in use.

SUMMARY OF THE INVENTION

An important feature of the present invention is to provide an improved sunshield for a motor vehicle used in conjunction with the windshield, the dashboard and the end pillars thereof and wherein the sunshield is self-supporting upon the dashboard and is yieldably retained against the windshield with the end panels compressively extended between the vehicle end pillars.

As another feature, the collapsible sunshield is constructed of a corrugated cardboard resilient material which includes a pair of generally symmetrical planar top and bottom sections of uniform height having a single horizontal fold line therebetween and wherein each of the sections includes non-symmetrical central and end panels arranged on transverse fold lines.

As another feature, top and bottom sections of the sunshield have a pair of generally planar inner and outer backing panels of reduced width between the central and end panels and arranged on additional transverse laterally spaced fold lines and wherein the backing panels facilitate compact folding of the sunshield when not in use.

As another feature, the top and bottom end panels at their ends are inclined downwardly and outwardly in order to conform with the angularity of the vehicle pillars between which the sunshield is yieldably interposed and self-supported against the windshield while extending along and upon the dashboard.

As another feature, there is provided a plurality of spaced inclined score lines in the end panels which are parallel to the inclined edges thereof to define a plurality of foldable end extensions of parallelogram shape in order to compressively fit between the end pillars depending upon their spacing for large or small cars or other vehicles, including vans or trucks.

As another feature, a plurality of extensions of parallelogram shape may be severable as desired to adapt the length of the sunshield to the distance between said end pillars.

As another feature, when not in use, the top section is adapted for folding over the bottom section, and the overlapped end panels are successively folded over the central panels in a stack.

These and other features and objects will be seen from the following specification and claims in conjunction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
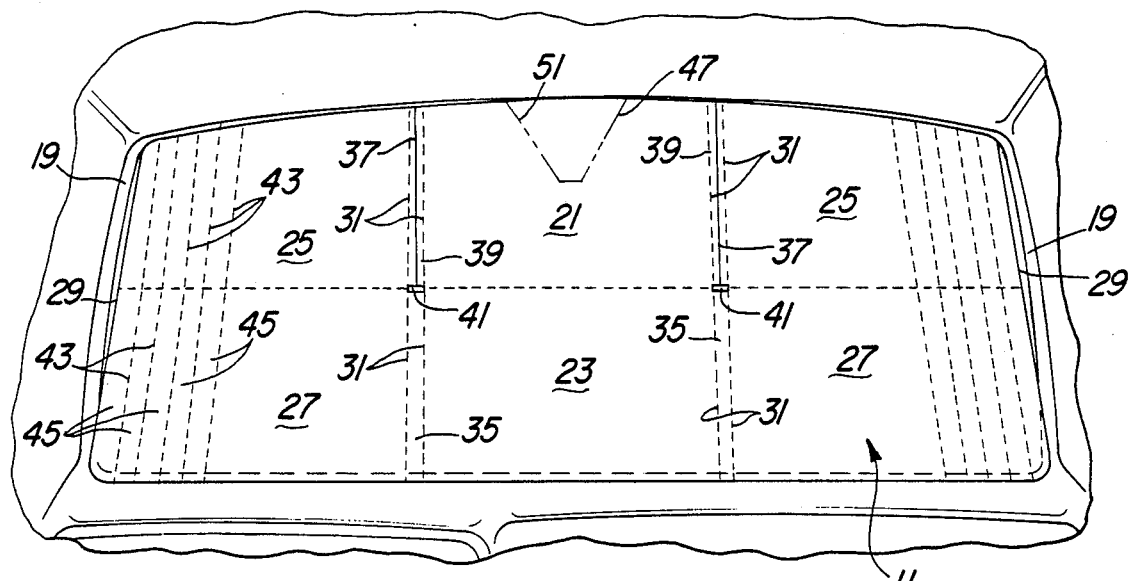
FIG. 1 is a fragmentary front perspective view from the interior of a vehicle illustrating the positioning of the present sunshield against the windshield.
Figure 5:
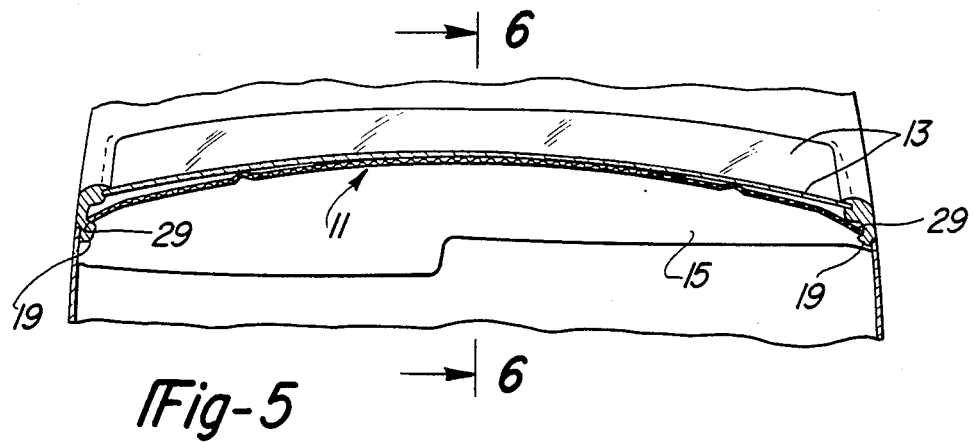
FIG. 5 is a fragmentary plan section of the unfolded sunshield interposed between the end pillars and in place against the windshield.
Figure 6:
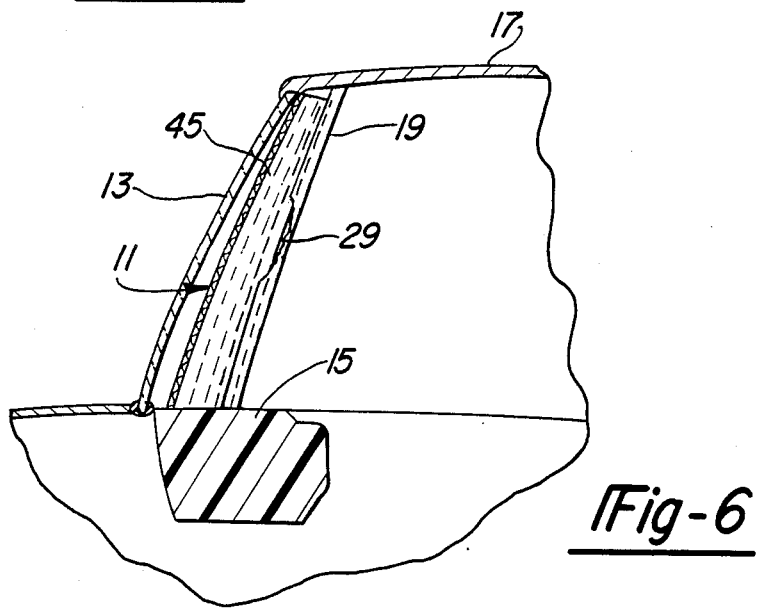
FIG. 6 is a transverse section taken in the direction of arrows 6-6 of FIG. 5.

Referring to the drawings, the present sunshield 11 is adapted for use and in combination with a vehicle windshield 13, FIGS. 1, 5 and 6. The vehicle, fragmentarily shown, includes a conventional dashboard 15, roof 17 and a pair of laterally spaced, rearwardly inclined side pillars 19 which are generally located rearwardly of the side mounting of the conventional vehicle windshield. It is contemplated that the vehicle may be a compact, small or large-size car, a van or a truck.

The present collapsible sunshield 11 is constructed of a corrugated cardboard resilient material and includes a pair of generally symmetrical planar top and bottom sections 18 and 20 of uniform height and having a single horizontal fold line 33 therebetween.

Figure 4:
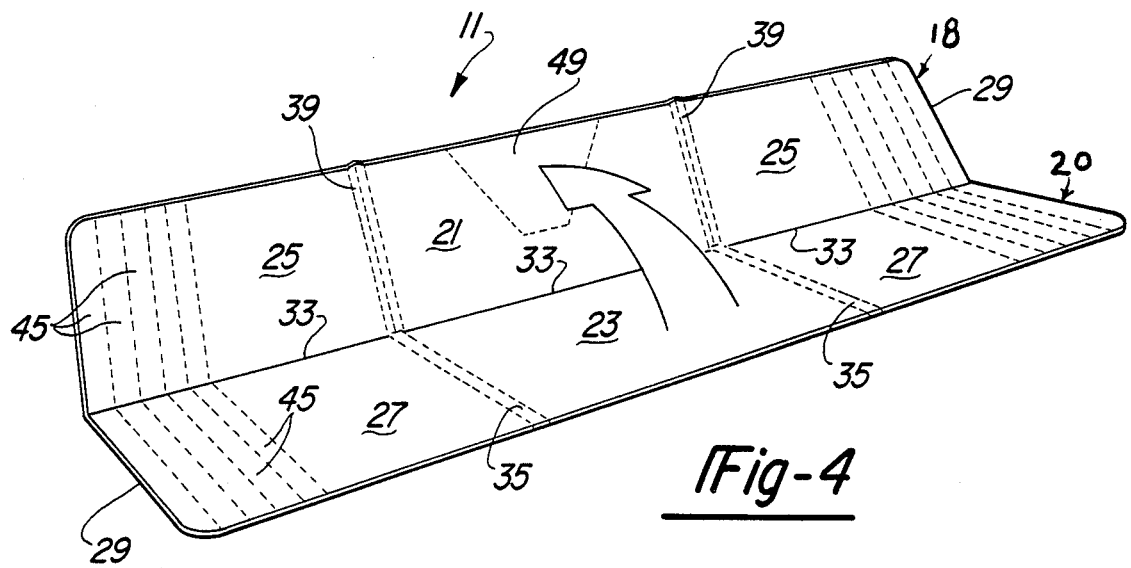
FIG. 4 is another perspective view illustrating the top and bottom sections as partly unfolded along a single fold line and with the corresponding panels of each section generally coplanar.

Each of the top and bottom sections 18 and 20 include respectively top central panel 21 of rectangular shape and bottom central panel 23 of rectangular shape, FIG. 4.

The respective top and bottom sections further include top end panels 25 and bottom end panels 27 which are shortened with respect to the central panels 21 and 23 and are generally of a trapezoid shape and thus not fully symmetrical with the central panels.

Each of the top and bottom end panels includes the downwardly and outwardly inclined edges 29 adapted for cooperative registry with a corresponding inclination of the laterally spaced pair of vehicle front pillars 19, FIGS. 1, 5 and 6.

The respective central and end panels are defined by laterally spaced parallel fold or score lines 31 which are transverse to the central fold line 33.

The respective top and bottom sections 18 and 20 have a pair of generally planar outer backing panels 35 and a corresponding pair of laterally spaced inner backing panels or backings 39 defined by the transverse score lines 31, FIG. 1.

Figure 2:
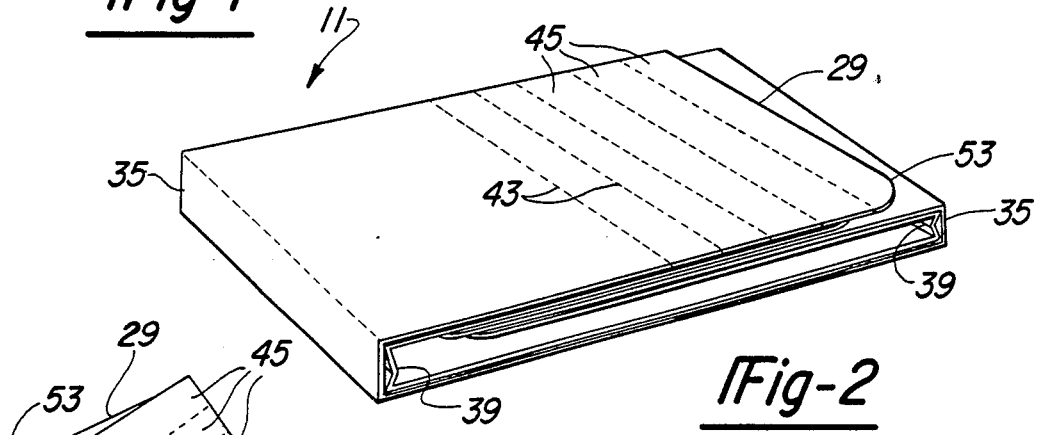
FIG. 2 is a front perspective view of the sunshield fully folded when not in use.

Arranged centrally of the inner backing panels 39 along their length are central fold lines 37. These assist in the partial collapse of the inner backings 39, FIG. 2. Intermediate the adjacent ends of the respective inner and outer backing panels 39 and 35 there are transverse slits 41 in order to facilitate folding of the respective panels, such as shown in FIG. 2.

Applied to the respective end panels 25 and 27 of the respective sections 18 and 20 are a series of laterally spaced parallel end scoring or fold lines 43. These are parallel to the inclined edges 29 of the respective end panels in order to define a plurality of laterally spaced extension parallelogram panels 45 of reduced width which form a part of the planar sunshield when in use, FIGS. 1 and 5.

Some of the parallelogram-shaped extension panels 45 are either foldable as desired or may be severed from the ends of the corresponding end panels 25 and 27 to accommodate and be snugly interposed between the front pillars 19 depending upon the spacing therebetween. By this construction the sunshield is self-supporting, such as shown in FIGS. 1, 5 and 6. The respective ends either at 29 or edges of the parallelogram extensions compressively and yieldably bear against the pillars 19, with some of said parallelogram panels severed, if desired, or are folded for a better fit between pillars 19, depending upon the distance therebetween. This corresponds to the total width of the vehicle, whether it be compact, a mini-vehicle, a van or truck.

Figure 3:
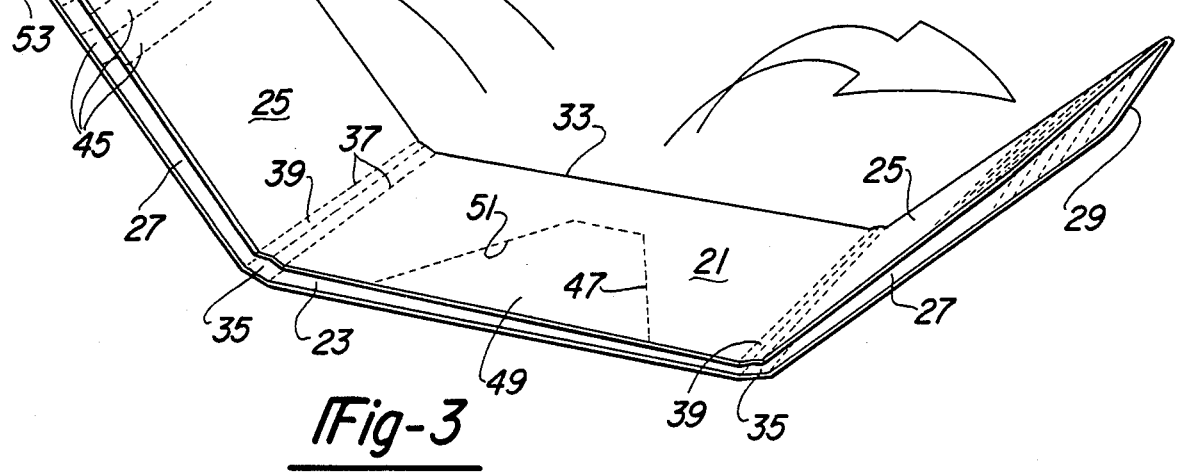
FIG. 3 is a front perspective view of the collapsed sunshield of FIG. 1 with the corresponding overlapped end panels partially open with respect to the overlapped central panels.

Optional scoring is shown at 47, FIGS. 3 and 4, of generally V shape and formed within the central panel 21 of the top section 18. Under some conditions, if there is a severe obstruction between the sunshield and the rearview mirror, the scoring provides for severance of the portion defined by the scoring for sufficient clearance to permit a snug assembly of the sunshield against the windshield 13. The sunshield is generally planar, but when curved to conform to the windshield is provided with the end panels 25, 27 interposed in compression between the respective pillars 19 and supportively mounted upon the dashboard 15. No other means of support is required. The clearance notch 51, FIG. 1, as an option is provided for the rearview mirror in the event that the section 49 has been manually separated from central panel 21.

In the preferred embodiment, the corresponding corners of the top and bottom sections are curved as at 53 in order to cooperate with the corners of the windshield 13 and adjacent corners between the pillars and the dashboard.

When not in use, the sunshield may be folded into the compact shape shown in FIG. 2, with the inner backings 39 partially collapsed as provided by the additional fold lines 37, FIG. 1, and wherein the respective inner and outer backings 39 and 35 between the central and end panels of the respective top and bottom sections 18 and 20 are generally at right angles thereto, FIG. 2.

The respective inner and outer backing panels are shown to overlie each other and could be described as composite backing panels when in the folded position. As is clear from FIG. 2, the composite backing panels are of a width that is greater than twice the thickness of the sunshield. This dimension allows the end panels to be received within the width of the backing panel and allows the sunshield to be more compactly folded.

In the initial unfolding, the first step is illustrated in FIG. 3, wherein the overlapped end panels 25, 27 are folded outwardly as shown by the arrows. A further step is shown in FIG. 4, with the top section 18 folded outwardly with respect to the bottom section 20 along fold line 33, as designated by the arrows.

It is contemplated that the sunshield, as partly folded in FIG. 3, may be extended flat upon most dashboards. This would keep the sun off the dashboard and steering wheel, but not obstruct the windshield. The present sunshield may also be used for the rear window of the vehicle to exclude the sun.

Having described my invention reference should now be made to the following claims:

I claim:

1. In a motor vehicle having a windshield, a dashboard and a pair of spaced end pillars:
   a collapsible sunshield of a corrugated cardboard resilient material having top and bottom edges and a thickness, including a pair of generally symmetrical planar top and bottom sections of the same height having a single horizontal fold line midway of said top and bottom edges;
   each section including non-symmetrical central and end panels of general rectangular shape arranged on transverse laterally spaced parallel fold lines; the panels of both sections being the same height;
   the top section having a pair of spaced inner backing panels; and the bottom section having a pair of spaced outer backing panels, a first of said inner backing panels being adjacent a first of said outer backing panels, a second of said inner backing panels being adjacent a second of said outer backing panels, said backing panels being of reduced width with respect to the central and end panels and arranged between said central and end panels on transverse laterally spaced fold lines, the ends of adjacent inner and outer backing panels being in registry;
   the sunshield extending closely adjacent and along said windshield substantially over its height and length with the respective end panels at their ends compressively anchored against said pillars and said bottom section being self-supported upon and along said dashboard and extending upwardly to cover a portion of said windshield;
   the width of said backing panels being greater than twice the thickness of said sunshield, such that said top and bottom sections can be folded upon said horizontal fold line so as to overlie each other, said adjacent first inner and outer backing panels overlying each other to form one composite backing panel, said second adjacent inner and outer backing panels overlying each other to form a second composite backing panel, one of said end panels being foldable on said transverse fold lines of one of said composite backing panels and received within the width of said other composite backing panel, said other end panel being foldable upon said transverse fold lines of said other composite backing panel to overlie said one end panel.

2. In the motor vehicle of claim 1, further comprising the top and bottom end panels at their ends being inclined downwardly and outwardly generally conforming to the angularity of said vehicle pillars.

3. In the motor vehicle of claim 2, further comprising a plurality of spaced inclined score lines in said end panels parallel to the inclined ends of said end panels defining a plurality of foldable end extensions of parallelogram shape to compressively fit between said pillars.

4. In the motor vehicle of claim 2, further comprising a plurality of spaced inclined score lines in said end panels parallel to the inclined ends of said end panels defining a plurality of selectively severable end extensions of parallelogram shape to compressively fit between said pillars.

5. In the motor vehicle of claim 1, further comprising when not in use the top section being folded to overlap the bottom section; and the overlapped end panels successively folded over the central panels in a stack.

6. In the motor vehicle of claim 5, further comprising the overlapped inner and outer backing panels being generally at right angles to the adjacent central and end panels respectively to form a compact unit for storage.

7. In the motor vehicle of claim 5, the inner backing panels being partly folded along their length; further comprising a transverse slit between and separating the adjacent ends of the inner and outer backing panels to facilitate the partial folding of the inner backing panels.

8. In the motor vehicle of claim 7, further comprising there being a central fold line along the length of the inner backing panels to further facilitate their partial folding.

9. In the motor vehicle of claim 1, further comprising the central panel of the top section including scoring of generally truncated V-shaped to selectively form on severance a truncated V-shaped notch for clearance of the vehicle rearview mirror.

* * * * *